(12) United States Patent
Kim et al.

(10) Patent No.: US 7,327,767 B2
(45) Date of Patent: Feb. 5, 2008

(54) SYNCHRONOUS TRANSFER MODE-256 ADDER/DROPPER

(75) Inventors: Byoung Sung Kim, Wonju (KR); Je Soo Ko, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 829 days.

(21) Appl. No.: 10/695,734

(22) Filed: Oct. 23, 2003

(65) Prior Publication Data

US 2004/0174871 A1  Sep. 9, 2004

(30) Foreign Application Priority Data

Mar. 5, 2003  (KR) .................... 10-2003-0013607

(51) Int. Cl.
 *H04J 14/00* (2006.01)
(52) U.S. Cl. ...................... 370/537; 370/540
(58) Field of Classification Search ............ 370/537, 370/540, 541
 See application file for complete search history.

(56) References Cited

U.S. PATENT DOCUMENTS

2003/0152079 A1* 8/2003 Loeffler et al. ............ 370/392
2003/0161355 A1* 8/2003 Falcomato et al. ......... 370/539

FOREIGN PATENT DOCUMENTS

| JP | 10-126350 | 5/1998 |
|---|---|---|
| KR | P1999-0053397 | 7/1999 |
| KR | 10-0211984 | 8/1999 |
| KR | 10-0358356 | 7/2001 |
| KR | P2002-0021744 | 3/2002 |

OTHER PUBLICATIONS

A. Herkersdorf et al., 'A Scalable SDH/SONET Framer Architecture For Datacom And Telco Applications',2000 IEEE, pp. 191-198.*

* cited by examiner

*Primary Examiner*—Melvin Marcelo
(74) *Attorney, Agent, or Firm*—Blakely, Sokoloff, Taylor & Zafman

(57) ABSTRACT

A synchronous transfer mode (STM)-256 adder/dropper which provides a communication path between STM-64 optical channels in an apparatus of multiplexing STM-64 optical channels into STM-256 electrical signals, is provided. The STM-256 adder/dropper transmits STM signals by multiplexing the STM signals at a low speed and simultaneously provides a communication path between lower channels.

14 Claims, 6 Drawing Sheets

US 7,327,767 B2

SYNCHRONOUS TRANSFER MODE-256 ADDER/DROPPER

BACKGROUND OF THE INVENTION

This application claims the priority of Korean Patent Application No. 2003-13607, filed on Mar. 5, 2003, in the Korean Intellectual Property Office, the disclosure of which is incorporated herein in its entirety by reference.

1. Field of the Invention

The present invention relates to an apparatus of multiplexing optical signals, and more particularly, to a synchronous transfer mode (STM)-256 adder/dropper which provides a communication path between STM-64 optical channels in an apparatus of multiplexing 4-channel STM-64 optical channels into STM-256 electrical signals.

2. Description of the Related Art

A conventional optical transmission apparatus which transmits STM signals by multiplexing the STM signals at a lower speed, provides only the function of multiplexing STM signals or the function of branching and adding STM signals at one node on an optical line to a network, if necessary, as disclosed in Korean Patent Registration No. 10-0256689 entitled "Optical Transmission Apparatus for Branch and Coupling".

SUMMARY OF THE INVENTION

The present invention provides a synchronous transfer mode (STM)-256 adder/dropper which transmits tributary signals by multiplexing the tributary signals in an existing tributary signal reception system and provides a communication path between lower channels such that data communication at a low speed and communication of maintenance signals can be performed without an additional communication line between lower sub-networks.

The present invention also provides a synchronous transfer mode (STM)-256 adder/dropper which performs a synchronization function for an STM-256 framer by synchronizing each of STM-64 electrical signals flowing through four channels.

According to an aspect of the present invention, a synchronous transfer mode (STM)-256 adder/dropper includes first through fourth STM-64 adders/droppers, which multiplex STM signals at a low speed between an STM-256 framer and an optical transceiver, add and drop the STM signals, and provide synchronized data to the STM-256 framer and the optical transceiver, and a switch unit, which switches data input/output of the STM-64 adders/droppers.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of the present invention will be described in detail with reference to the accompanying drawings.

Figure 1:
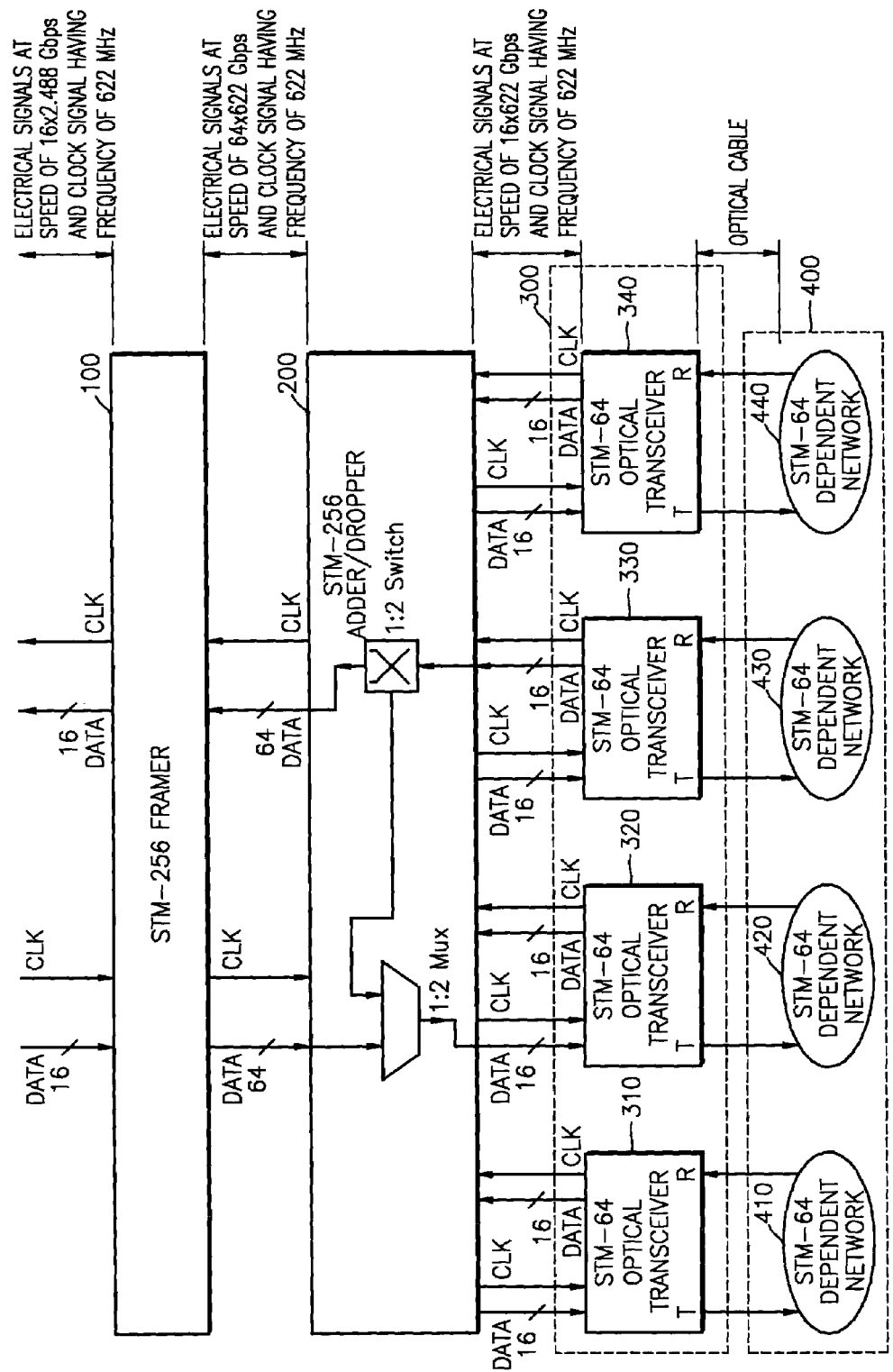
FIG. 1 is a block diagram illustrating a system for receiving 4-channel synchronous transfer mode (STM)-64 tributary signals, having an STM-256 adder/dropper according to an embodiment of the present invention.
Figure 2:
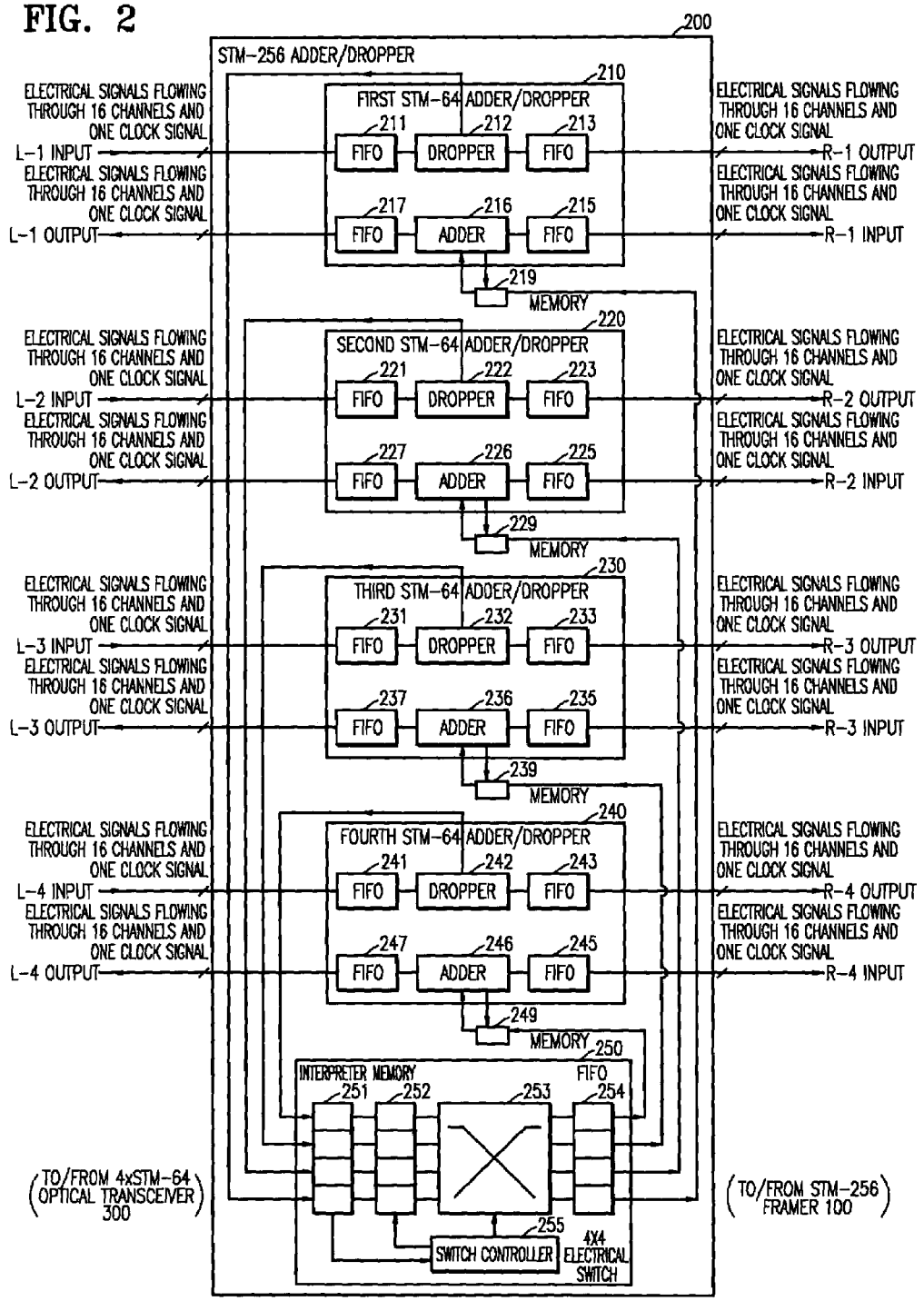
FIG. 2 is a detailed block diagram illustrating the structure of the STM-256 adder/dropper shown in FIG. 1.

FIG. 1 is a block diagram illustrating a system for receiving 4-channel synchronous transfer mode (STM)-64 tributary signals, having an STM-256 adder/dropper 200 according to an embodiment of the present invention, and FIG. 2 is a detailed block diagram illustrating the structure of the STM-256 adder/dropper 200 shown in FIG. 1.

Referring to FIG. 1, the STM-256 adder/dropper 200 is connected between an electrical interface of an optical transceiver 300 and a lower network of an STM-256 framer 100. Although will be described in detail below, the STM-256 adder/dropper 200 includes four STM-64 adders/droppers 210, 220, 230, and 240, which multiplex STM signals at a lower speed, transmit the STM signals and provides a communication path between lower channels.

The optical transceiver 300 includes four STM-64 optical transceivers 310, 320, 330, and 340, which perform data transmission and reception with each of the STM-64 adders/droppers 210, 220, 230, and 240 of the STM-256 adder/dropper 200. Each of the STM-64 optical transceivers 310, 320, 330, and 340 is connected to each of STM-64 tributary networks 410, 420, 430, and 440.

Referring to FIG. 2, the STM-256 adder/dropper 200 includes four STM-64 adder/droppers 210, 220, 230, and 240 and a 4×4 electrical switch 250. The STM-256 adder/dropper 200 performs data communication at a low speed and communication of maintenance signals between lower sub-networks without an additional communication line. Also, the STM-256 adder/dropper 200 synchronizes electrical signals flowing through four channels of the STM-64 adders/droppers 210, 220, 230, and 240, thereby performing a synchronization function for the STM-256 framer 100.

Before explaining the operation of the STM-256 adder/dropper 200, a connection relation between the STM-256 adder/dropper 200 and lower sub-networks will be described below.

Referring to FIGS. 1 and 2, in upstream connection from each of the optical transceivers 310, 320, 330, and 340 to each of the STM-64 adders/droppers 210, 220, 230, and 240, which are elements of the STM-256 adder/dropper 200, each of the STM-64 adders/droppers 210, 220, 230, and 240 receives an electrical data signal DATA at the speed of 622 Mbps flowing through 16 channels and one clock signal CLK having a frequency of 622 MHz from each of the optical transceivers 310, 320, 330, and 340. In this case, the electrical data signal DATA flowing through each of 16 channels and the clock signal CLK are synchronized with each other. In downstream connection from each of the STM-64 adders/droppers 200, 210, 220, and 230 to each of the optical transceivers 310, 320, 330, and 340, each of the STM-64 adders/droppers 210, 220, 230, and 240 transmits an electrical data signal DATA at the speed of 622 Mbps flowing through 16 channels and one clock signal CLK having a frequency of 622 MHz to each of the optical transceivers 310, 320, 330, and 340. In this case, the electrical data signal DATA flowing through each of 16 channels and the clock signal CLK are synchronized with each other. Here, a low voltage differential signal (LVDS) may be used as each electrical data signal DATA and each clock signal CLK, which are received and transmitted between the STM-256 adder/dropper 200 and the lower sub-networks according to a connection standard of an optical transceiver.

Subsequently, a connection relation between the STM-256 adder/dropper 200 and the upper STM-256 framer 100 will be described below.

In upstream connection from each of the STM-64 adders/droppers 210, 220, 230, and 240 of the STM-256 adder/dropper 200 to the STM-256 framer 100, an electrical data signal DATA at a speed of 622 Mbps flowing through 64 channels and one through four clock signals CLKs, each having a frequency of 622 MHz are connected between the STM-256 adder/dropper 200 and the STM-256 framer 100. The electrical data signal DATA flowing through each of 64 channels and the clock signal CLK are synchronized with each other, and the number of connected clock signals is varied according to the demand of the STM-256 framer 100. In downstream connection from the STM-256 framer 100 to each of the STM-64 adders/droppers 210, 220, 230, and 240, an electrical data signal DATA at a speed of 622 Mbps flowing through 64 channels and one through four clock signals CLKs, each having a frequency of 622 MHz are connected between the STM-256 adder/dropper 200 and the STM-256 framer 100. Like in upstream connection, the electrical data signal DATA flowing through each of 64 channels and the clock signal CLK are synchronized with each other, and the number of connected clock signals is varied according to the demand of the STM-256 framer 100. In this case, a differential common mode logic (CML) signal is used as each electrical data signal DATA and each clock signal CLK according to a connection standard of the optical transceiver 300.

Figure 3:
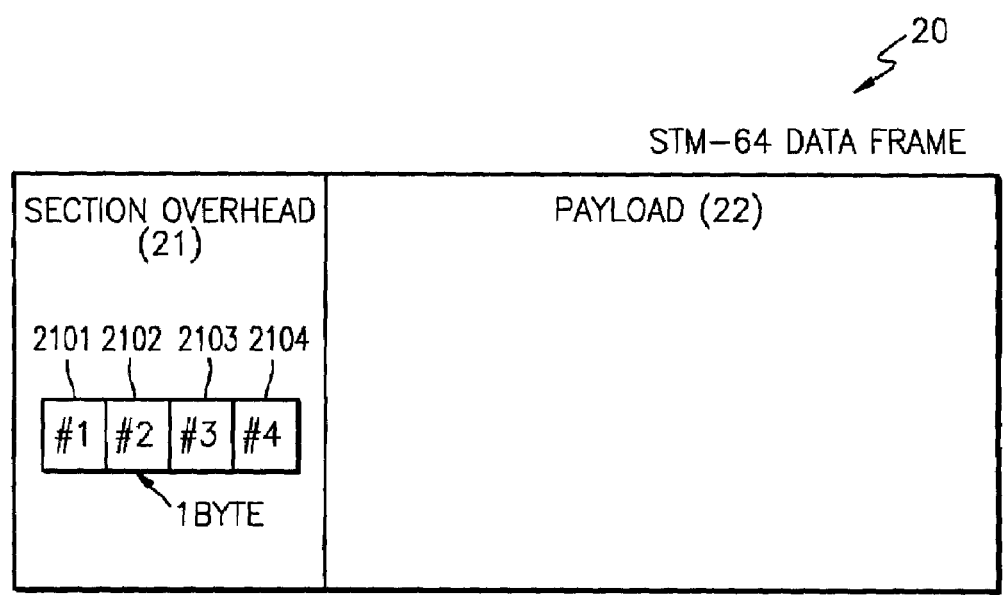
FIG. 3 illustrates the structure of an STM-64 data frame for STM-64 adders/droppers shown in FIG. 2.

FIG. 3 illustrates the structure of an STM-64 data frame 20 for STM-64 adders/droppers 210, 220, 230, and 240 shown in FIG. 2. Referring to FIG. 3, the STM-64 data frame 20 includes a section overhead 21 and a payload 22. In the present invention, arbitrary 4 bytes included in the section overhead 21 are used to add and drop STM signals. In general, bytes reserved for future use exist in the section overhead 21. Thus, in the present invention, adding and dropping of the STM signals is performed using the bytes.

Subsequently, Tables 1 through 4 represent states meant by arbitrary 4 bytes included in the section overhead 21.

TABLE 1

| First byte value | States |
| --- | --- |
| x0 | Passed |
| xF | Dropping or adding |

TABLE 2

| Second byte value | States |
| --- | --- |
| 00 | (L-1)-th channel |
| 0F | (L-2)-th channel |
| F0 | (L-3)-th channel |
| FF | (L-4)-th channel |

TABLE 3

| Third byte value | States |
| --- | --- |
| 00 | (L-1)-th channel |
| 0F | (L-2)-th channel |
| F0 | (L-3)-th channel |
| FF | (L-4)-th channel |

TABLE 4

| Fourth byte value | States |
| --- | --- |
| x0 | Payload vacant |
| xF | Payload full |

The adding and dropping operation of the STM-256 adder/dropper 200 will be described below with reference to Tables 1 through 4.

A first byte 2101 among arbitrary 4 bytes preset in the section overhead 21 is a byte which indicates adding or dropping STM signals to or from a corresponding data frame. If the value of the first byte 2101 is 'x0(hexa)', this represents that STM signals are not added or dropped to or from the corresponding frame but passed. If the value of the first byte 2101 is 'xF(hexa)', this represents that the STM signals are added or dropped to or from the corresponding frame. A second byte 2102 among the arbitrary 4 bytes represents on original channel information of a data frame to or from which the STM signals are added or dropped, i.e., dispatch address. A third byte 2103 among the arbitrary 4 bytes represents channel information on a destination of a data frame to or from which the STM signals are added or dropped, i.e., address of destination. In addition, a fourth byte 2104 among the arbitrary 4 bytes represents whether a payload of a corresponding frame is vacant or full. In this case, the value of each byte is determined as an arbitrary value, and a variety of values may be actually used.

Figure 4:
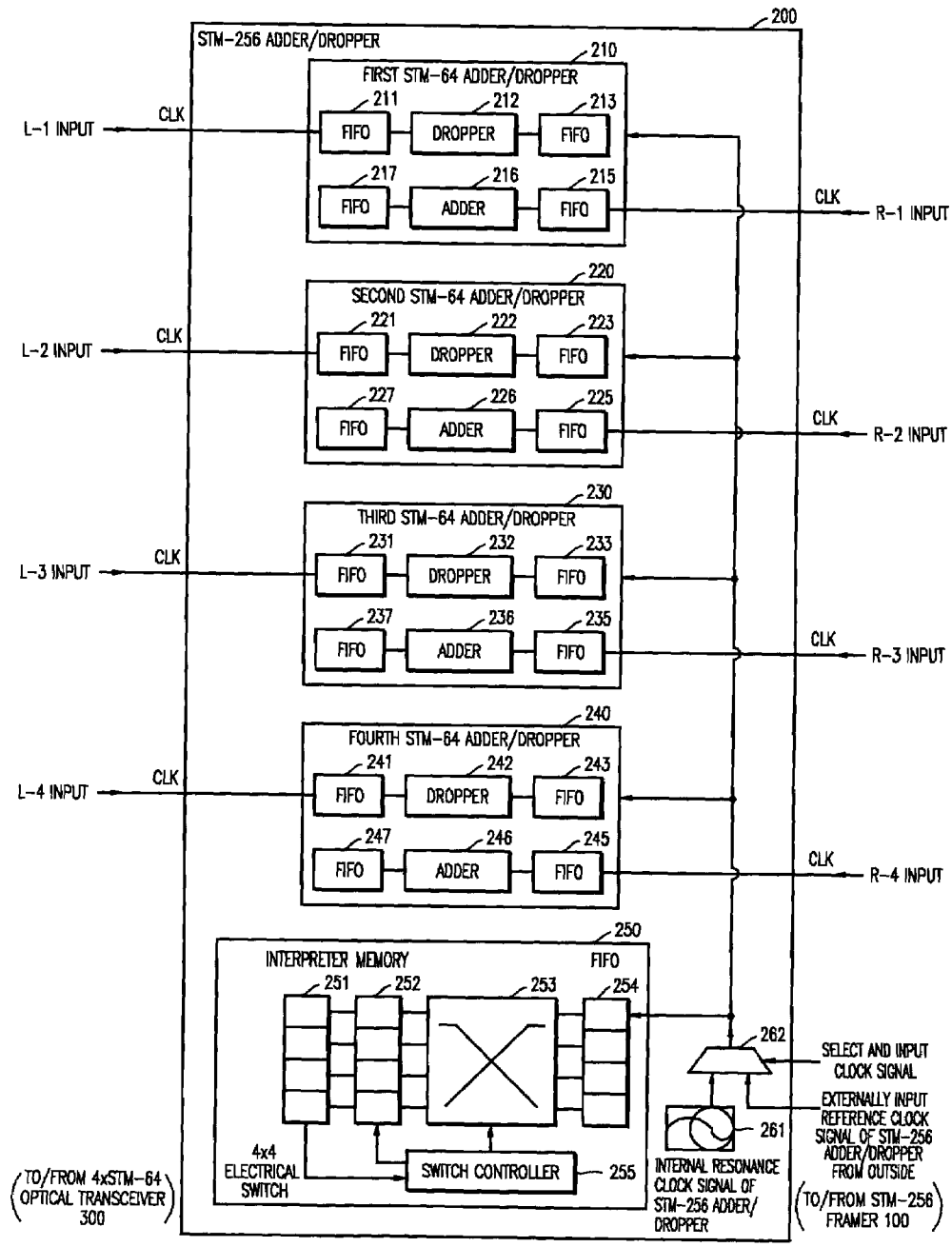
FIG. 4 illustrates a connection relation of internal clock signals between each of the STM-64 adders/droppers, which are elements of the STM-256 adder/dropper shown in FIG. 2.

FIG. 4 illustrates a connection relation of internal clock signals between each of the STM-64 adders/droppers 210, 220, 230, and 240, which are elements of the STM-256 adder/dropper 200 shown in FIG. 2.

Referring to FIGS. 2 through 4, the STM-256 adder/dropper 200 includes four STM-64 adders/droppers 210, 220, 230, and 240 and a 4×4 electrical switch for switching data input/output thereof. Each of the STM-64 adders/droppers 210, 220, 230, and 240 includes one of droppers 212, 222, 232, and 242 and one of adders 216, 226, 236, and 246. A pair of input/output FIFOs are connected to each adder/dropper. A clock generator 261 and a multiplexer 262 are included inside the STM-256 adder/dropper 200 (see FIG. 4). One selected from an internal resonance clock signal generated in the clock generator 261 and an externally-input clock signal is used as a reference internal clock signal. The internal clock signal selected by the multiplexer 262 is transmitted to each of the STM-64 droppers 212, 222, 232, and 242 and the 4×4 electrical switch 150.

Each of the STM-64 droppers 212, 222, 232, and 242 interprets the section overhead 21 of the STM-64 signal frame 20 and outputs electrical signals flowing through 16 channels to a signal path of the STM-256 framer 100 or an input path of the 4×4 electrical switch 250. Arbitrary bytes are preset in the section overhead 21 of the STM-64 frame 20 so as to select one of the two paths. A mark that represents a frame in which a corresponding frame is vacant, is included in the section overhead 21 of a frame which was dropped to the 4×4 electrical switch 250. After marking, then, the frame is transmitted to the STM-256 framer 100.

For example, if the first byte 2101 of the section overhead 21 of the STM-64 frame 20 has the value of 'x0', the corresponding frame is directly connected to the STM-256 framer 100 without adding and dropping of STM signals. If the first byte 2101 of the section overhead 21 has the value of 'xF', the corresponding frame is transmitted to the 4×4 electrical switch 250, and simultaneously, the payload 22 of the corresponding frame is deleted, and the value of the fourth byte 2104 of the section overhead 21 is set to 'x0', and this represents that the payload 22 is vacant, and the corresponding frame is transmitted to the STM-256 framer 100.

Figure 5:
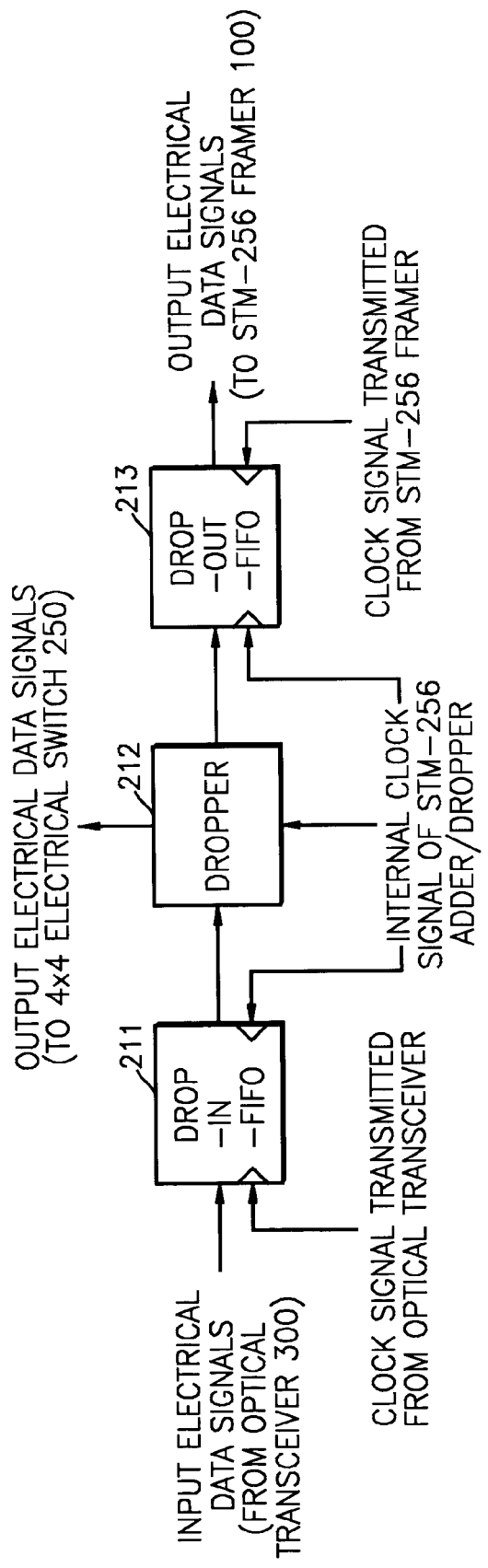
FIG. 5 illustrates an example of clock signals and data flow of the STM-64 dropper shown in FIG. 4.

FIG. 5 illustrates an example of clock signals and data flow of the STM-64 dropper 212 shown in FIG. 4. Referring to FIG. 5, a clock signal transmitted from the optical transceiver 300 is used as an input side clock signal for a drop-in-FIFO 211 of the STM-64 dropper 212, and an internal clock signal output from the STM-256 adder/dropper 200 is used as an output side clock signal for the drop-in-FIFO 211. An internal clock signal of the STM-256 adder/dropper 200 is used as an input side clock signal for a drop-out-FIFO 213 of the STM-64 dropper 212, and a clock signal transmitted from the STM-256 framer 100 is used as an output side clock signal for the drop-out-FIFO 213.

Figure 6:
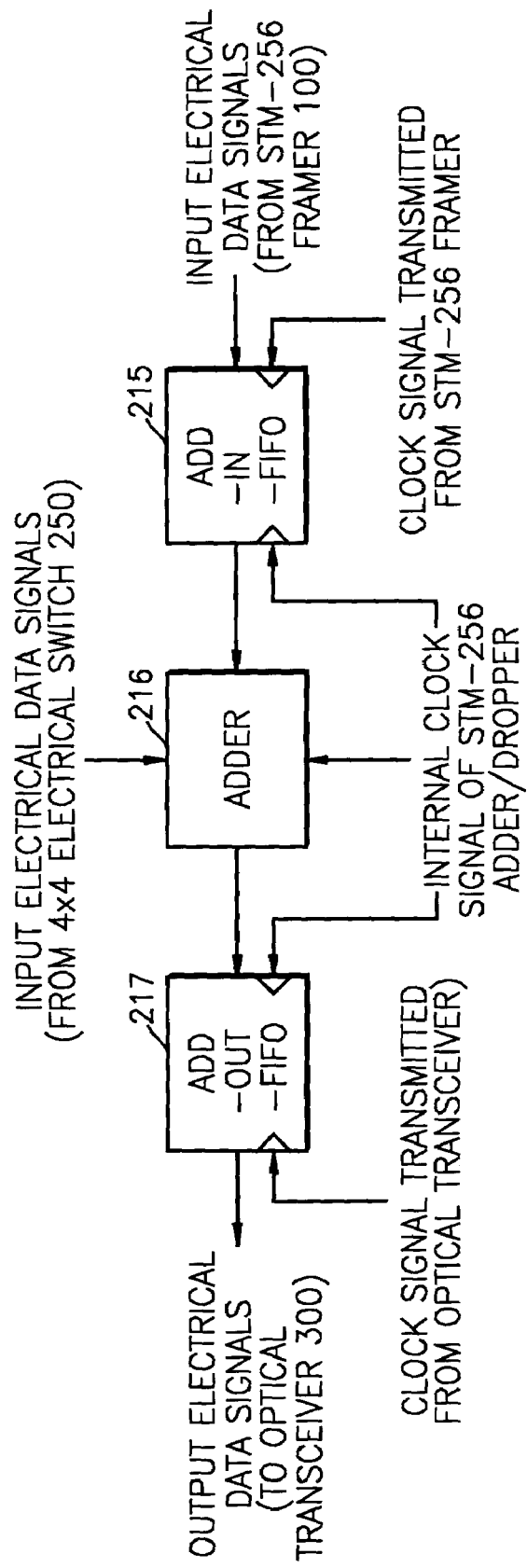
FIG. 6 illustrates an example of clock signals and data flow of the STM-64 adders shown in FIG. 4.

FIG. 6 illustrates an example of clock signals and data flow of the STM-64 adder 216 shown in FIG. 4. Referring to FIG. 6, the STM-64 adder 216 performs the function of adding a frame transmitted from the 4×4 electrical switch 250 to flow of a data frame transmitted from the upper STM-256 framer 100 to lower sub-networks.

The STM-64 adder 216 observes an overhead of a main data frame (i.e., the frame transmitted from the STM-256 framer 100) and recognizes a vacant frame. The STM-64 adder 216 adds a frame transmitted from the 4×4 electrical switch 250 to the location of the vacant frame. In this case, a predetermined mark that represents whether a corresponding frame is transmitted from the STM-256 framer 100 or is added by the 4×4 electrical switch 250, is included in the overhead of the added frame. The above operation can be achieved by allocating a unique address information to each sub-network and adding the information to an overhead of a corresponding frame.

For example, if the value of fourth byte 2104 of the overhead of the data frame transmitted from the STM-256 framer 100 is 'x0', a frame transmitted from the 4×4 electrical switch 250 is added to the location of the data frame.

In the present invention, a memory 219 is provided between the 4×4 electrical switch 250 and the STM-64 adder 216 so that the frame transmitted from the 4×4 electrical switch 250 is in a stand-by state while the overhead of the data frame transmitted from the STM-256 framer 100 is observed (see FIG. 2). The memory 219 stores the frame transmitted from the 4×4 electrical switch 250 and outputs stored data to the STM-64 adder 216 in response to control of the STM-64 adder 216.

Subsequently, a clock signal used in an add-in FIFO 215 and an add-out FIFO 217 of the STM-64 adder 216 shown in FIG. 6 will be described below.

A clock signal transmitted from the STM-256 framer 100 is used as an input side clock signal for an add-in-FIFO 215 of the STM-64 adder 216, and an internal clock signal of the STM-256 adder/dropper 200 is used as an output side clock signal for the add-in-FIFO 215. An internal clock signal of the STM-256 adder/dropper 200 is used as an input side clock signal for an add-out-FIFO 217 of the STM-64 adder 216, and a clock signal transmitted from the optical transceiver 300 is used as an output side clock signal for the add-out-FIFO 217.

As described above, the internal clock signal of the STM-256 adder/dropper 200 is used as a clock signal for each of the STM-64 adders/droppers 210, 220, 230, and 240. By using separated additional internal clock from clock signals output from the optical transceiver 300 and the STM-256 framer 100, input/output of each optical transceiver 300 can be synchronized when those are input or output, and input/output of the STM-256 framer 100 also can be synchronized when input or output.

Subsequently, the structure and operation of the 4×4 electrical switch 250 will be described below with reference to FIGS. 4 through 6.

The 4×4 electrical switch 250 includes an interpreter 251, a memory 252, a switch 253, a FIFO 254, and a switch controller 255. The interpreter 251 of the 4×4 electrical switch 250 interprets an overhead of a frame transmitted from each of the STM-64 droppers 212, 222, 232, and 242, obtains information on the STM-64 adders 216, 226, 236, and 246 corresponding to destinations and transmits the information to the switch controller 255. The switch 253 connects the frame transmitted from each of the STM-64 droppers 212, 222, 232, and 242 to each of the STM-64 adders 216, 226, 236, and 246 corresponding to destinations in response to control of the switch controller 255.

The switch controller 255 controls a path of the switch 253 in response to the input information on the STM-64 adders 216, 226, 236, and 246 and outputs an input frame to a corresponding output port. The 4×4 electrical switch 250 includes a data memory 252 between input ports of the switch 253 and the interpreter 251, so as to prevent a frame from being simultaneously output to the same destination port. The data memory 252 is controlled by the switch controller 255. The 4×4 electrical switch 250 having the above structure uses an internal clock signal of the STM-256 adder/dropper 200 as a reference clock signal. The operation performed according to the value of the overhead of the frame input into the 4×4 electrical switch 250 will be described below.

The 4×4 electrical switch 250 reads the second byte 2102 and the third byte 2103 of the section overhead 21 included in the data frame 20 transmitted from each of the STM-64 droppers 212, 222, 232, and 242 and finds out information on a dispatch address and a destination address. In addition, the 4×4 electrical switch 250 transmits the information to the switch controller 255, controls the state of the data memory 252 and the switching state of the switch 253 and outputs a corresponding frame to a destination channel via the FIFO 254. The STM-256 adder/dropper 200 according to the present invention that performs the function can be embodied in a single chip shape or field-programmable gate array (FPGA) and thus can be applied to actual applications.

As described above, in the STM-256 adder/dropper according to the present invention, data communication at a low speed and communication of maintenance signals can be performed without an additional communication line between lower STM-64 sub-networks, and synchronized data can be provided to an STM-256 framer and each optical transceiver.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A synchronous transfer mode (STM)-256 adder/dropper comprising:
   first through fourth STM-64 adders/droppers, which multiplex STM signals at a low speed between an STM-256 framer and an optical transceiver, add and drop the STM signals, and provide synchronized data to the STM-256 framer and the optical transceiver; and
   a switch unit, which switches data input/output of the STM-64 adders/droppers.

2. The STM-256 adder/dropper of claim 1, further comprising:
   a clock generator, which generates an internal resonance clock signal; and
   a multiplexer, which selects one from a clock signal generated in the clock generator and an externally-input clock signal and transmits the selected clock signal to the first through fourth STM-64 adders/droppers and the switch unit.

3. The STM-256 adder/dropper of claim 1, wherein each of the STM-64 adders/droppers comprises:
   an STM-64 dropper, which analyzes an overhead of a frame of the STM signals and outputs the STM signals to one of a signal path of the STM-256 framer and an input path of the switch unit according to the analyzed result; and
   an STM-64 adder, which adds a frame transmitted from the switch unit to flow of the frame from the STM-256 framer to lower sub-networks.

4. The STM-256 adder/dropper of claim 3, wherein the overhead of the frame of the STM signals comprises:
   a first control byte, which indicates adding or dropping of a data frame;
   a second control byte that represents a dispatch address of the added or dropped data frame;
   a third control byte that represents a destination address of the added or dropped data frame; and
   a fourth control byte that represents whether a payload of the data frame is vacant.

5. The STM-256 adder/dropper of claim 3, wherein, if it is determined that the payload of the frame is vacant, the STM-64 adder adds a frame transmitted from the switch unit to the vacant region.

6. The STM-256 adder/dropper of claim 3, further comprising a memory, which is connected between each of the STM-64 adders and the switch unit and stores the frame transmitted from the switch unit when the overhead of the frame is analyzed.

7. The STM-256 adder/dropper of claim 3, further comprising first through fourth input buffers, which are connected to an input terminal of each of the STM-64 droppers, and wherein the input buffers use a clock signal transmitted from the optical transceiver as an input side clock signal and use an internal clock signal of the STM-256 adder/dropper as an output side clock signal.

8. The STM-256 adder/dropper of claim 3, further comprising first through fourth output buffers, which are connected to an output terminal of each of the STM-64 droppers, and wherein the output buffers use an internal clock signal of the STM-256 adder/dropper as an input side clock signal and use a clock signal transmitted from the STM-256 framer as an output side clock signal.

9. The STM-256 adder/dropper of claim 3, further comprising fifth through eighth input buffers, which are connected to an input terminal of each of the STM-64 adders, and wherein the input buffers use a clock signal transmitted from the STM-256 framer as an input side clock signal and use an internal clock signal of the STM-256 adder/dropper as an output side clock signal.

10. The STM-256 adder/dropper of claim 3, further comprising fifth through eighth output buffers, which are connected to an output terminal of each of the STM-64 adders, and wherein the output buffers use an internal clock signal of the STM-256 adder/dropper as an input side clock signal and use a clock signal transmitted the optical transceiver as an output side clock signal.

11. The STM-256 adder/dropper of claim 3, wherein the switch unit comprises:
    a switch, which connects the frame transmitted from each of the STM-64 droppers to an arbitrary STM-64 adder corresponding to a destination;
    an interpreter, which interprets the overhead of the frame transmitted from each of the STM-64 droppers and obtains information on the destination; and
    a switch controller, which controls a path of the switch in response to the information obtained by the interpreter.

12. The STM-256 adder/dropper of claim 11, wherein the switch unit further comprises a data memory, which is connected to the interpreter and the switch and prevents the frame from being simultaneously output to the same destination port.

13. The STM-256 adder/dropper of claim 11, wherein the switch unit further comprises an output buffer, which temporarily stores the frame output from the switch.

14. The STM-256 adder/dropper of claim 11, wherein the switch is a 4×4 electrical switch.

* * * * *